| | | |
|---|---|---|
| (12) | United States Patent <br> Devys et al. | (10) Patent No.: US 11,098,521 B2 <br> (45) Date of Patent: Aug. 24, 2021 |

(54) THERMAL CONTROL GLAZING WITH A PROTECTIVE POLYMER FILM

(71) Applicant: SAINT-GOBAIN GLASS FRANCE, Courbevoie (FR)

(72) Inventors: Lucie Devys, Paris (FR); Nisita Wanakule, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 323 days.

(21) Appl. No.: 16/060,966

(22) PCT Filed: Dec. 14, 2016

(86) PCT No.: PCT/FR2016/053410 <br> § 371 (c)(1), <br> (2) Date: Jun. 11, 2018

(87) PCT Pub. No.: WO2017/103465 <br> PCT Pub. Date: Jun. 22, 2017

(65) Prior Publication Data

US 2018/0355659 A1      Dec. 13, 2018

(30) Foreign Application Priority Data

Dec. 15, 2015   (FR) ..................................... 1562371

(51) Int. Cl.
| | |
|---|---|
| *E06B 3/67* | (2006.01) |
| *C03C 17/42* | (2006.01) |
| *C03C 17/36* | (2006.01) |
| *C03C 17/38* | (2006.01) |

(52) U.S. Cl.
CPC .......... *E06B 3/6715* (2013.01); *C03C 17/366* (2013.01); *C03C 17/3644* (2013.01); *C03C 17/3681* (2013.01); *C03C 17/38* (2013.01); *C03C 17/42* (2013.01); *C03C 2217/212* (2013.01); *C03C 2217/256* (2013.01); *C03C 2217/78* (2013.01); *C03C 2218/116* (2013.01); *C03C 2218/156* (2013.01)

(58) Field of Classification Search
None
See application file for complete search history.

(56) References Cited

U.S. PATENT DOCUMENTS

| | | | | |
|---|---|---|---|---|
| 2,595,800 | A * | 5/1952 | McGraw | C09D 125/10 428/434 |
| 2,595,867 | A | 5/1952 | McGraw et al. | |
| 3,265,765 | A * | 8/1966 | Holden | C08F 297/046 525/271 |
| 4,414,254 | A * | 11/1983 | Iwata | B05D 5/06 428/34 |
| 6,045,896 | A * | 4/2000 | Boire | C03C 17/36 204/192.23 |
| 8,092,920 | B2 * | 1/2012 | Saavedra | B32B 7/02 428/515 |
| 2007/0281170 | A1 | 12/2007 | Seth et al. | |
| 2014/0127500 | A1* | 5/2014 | Carberry | B32B 17/10752 428/345 |
| 2014/0170404 | A1* | 6/2014 | Wang | G06F 1/1637 428/220 |
| 2015/0022879 | A1* | 1/2015 | Kawasaki | B32B 27/08 359/359 |

FOREIGN PATENT DOCUMENTS

| | | |
|---|---|---|
| JP | 54-66536 A | 5/1979 |
| JP | 2013-145358 A | 7/2013 |
| JP | 2015-171815 A | 10/2015 |
| RU | 2 213 663 C1 | 10/2003 |
| RU | 2005 132 817 A | 6/2006 |
| RU | 2012 100 706 A | 7/2013 |
| WO | WO 2013/079400 A1 | 6/2013 |
| WO | WO 2013/089185 A1 | 6/2013 |
| WO | WO 2013/096081 A1 | 6/2013 |

OTHER PUBLICATIONS

International Search Report dated Mar. 15, 2017 in PCT/FR2016/053410 filed Dec. 14, 2016.

* cited by examiner

*Primary Examiner* — Callie E Shosho
*Assistant Examiner* — John Vincent Lawler
(74) *Attorney, Agent, or Firm* — Oblon, McClelland, Maier & Neustadt, L.L.P.

(57) ABSTRACT

A solar-control or thermally insulating or anticondensation-function glazing unit includes at least one substrate equipped with a stack of thin layers reflecting infrared radiation. The stack is covered with a protective polymer film made of styrene-butadiene copolymer, the thickness of the polymer film being smaller than 10 microns.

20 Claims, No Drawings

THERMAL CONTROL GLAZING WITH A PROTECTIVE POLYMER FILM

The invention relates to glazing units comprising a stack of thin layers acting on solar (near-IR) or thermal (far-IR) infrared radiation (IR).

A glazing unit according to the invention is more particularly suitable for installation in buildings, even though it is not limited to this application and may especially also be used in the automotive field, in particular as a side window, sunroof or even as a rear windshield. It is also suitable for use as a refrigerator door or window having an antifog (anticondensation) function, especially in showcases displaying frozen products in supermarkets.

As is known, by selecting the chemical nature, thicknesses and order of the thin layers forming the stack, it is possible to significantly affect the amount of radiant solar energy entering or exiting a room or passenger compartment. In particular, such a glazing unit makes it possible to prevent the interior of a room or passenger compartment from getting excessively hot during the summer and thus contributes to limiting the power consumed by air-conditioning units keeping it cool. According to another aspect of the invention, the latter also relates to thermally insulating glazing units, often referred to as low-E or low-emissivity glazing units in the field, which are more particularly intended to thermally insulate buildings or vehicles. The low-E function may also advantageously be used in the glazed portions of refrigerated appliances, such as in a refrigerator window or door having an antifog function.

These layer-comprising glazing units are subject to a certain number of constraints: as regards the glazing unit, the layers employed must, firstly, be sufficiently filtering with respect to solar radiation, i.e. they must provide thermal insulation while however letting at least some light pass, such as measured by light transmittance $T_L$. Furthermore, this thermal performance must not adversely affect the optical appearance and attractiveness of the glazing unit: it is thus desirable to be able to modulate the level of light transmission of the substrate, while retaining a color that is judged attractive and also preferably substantially neutral, most particularly in exterior and/or interior reflection.

According to another essential aspect, these layers must also be sufficiently durable, especially if, once the glazing unit has been installed, they are positioned on one of the external (interior or exterior) faces of the glazing unit (as opposed to the internal faces, which are turned toward the central gas-filled cavity of a double glazing unit, for example, or even toward the thermoplastic sheet of a laminated glazing unit).

At the present time many stacks that are what are referred to as "thermal control" stacks, i.e. stacks that allow the heat flow entering or exiting from the glazed areas of a building or passenger compartment to be regulated, are known.

They are grouped under the designation thermally insulating glazing units. They are sold and used essentially in two categories:
  either essentially to provide protection of a dwelling from solar radiation and prevent excess heating, such glazing units being qualified as solar-control glazing units in the art;
  or essentially to thermally insulate a dwelling and prevent heat loss, these glazing units then being qualified insulating glazing units.

The expression "solar-control" is thus understood, in the context of the present invention, to mean the ability of a glazing unit to limit the energy flux and in particular the solar infrared radiation (SIR) passing through it from the exterior to the interior of the dwelling or passenger compartment.

The expression "thermally insulating" is thus understood to mean a glazing unit equipped with at least one functional layer that decreases energy loss through the unit, said layer having reflective properties that allow it to reflect thermal IR radiation (also called the mid-infrared) comprised between 3 and 50 microns.

In certain countries, standards require that glazing units both have solar-control properties and be thermally insulating.

As is well-known, for example as described in the reference publication "Les techniques de l'ingénieur, *Vitrage á isolation thermique renforcée*, C3635 (2004)", such a reflective property is directly dependent on the emissivity of the face of the glazing unit equipped with the stack comprising the one or more functional layers.

Generally, all the thermal and luminous properties presented in the present description are obtained according to the principles and methods described in the international standards ISO 9050 (2003) and ISO 10292 (1994) or even NF EN 12898:2001, relating to the evaluation of the luminous and energetic properties of glazing units used in glass in building.

Associated with their glazing substrate, these coatings must also preferably be aesthetically pleasing, i.e. the glazing unit equipped with its stack must have a sufficiently neutral color in transmission as in reflection not to discomfort users, or alternatively a slightly blue or green tint, especially in the architectural field. By a neutral color, what is meant, in the context of the present invention, in the CIE LAB (L*, a*, b*) color system, is an absolute a* and b* value lower than or equal to 10.

The highest performance stacks sold at the present time to solve the above problems incorporate a functional layer (i.e. the layer responsible for the properties that cause IR radiation to be reflected) made of metal, a precious metal, such as gold or silver, or even copper (or an alloy of these metals), and in particular silver, functioning essentially in a mode in which most of the incident IR (infrared) radiation is reflected. These stacks may advantageously be used in low-emissivity (low-E) glazing units to thermally insulate buildings, but may also, more restrictively, be used in solar-control glazing units.

These layers are however very sensitive to moisture and therefore are exclusively used in double glazing units, on face 2 or 3 thereof, in order to be protected from moisture. It is currently accepted that it is not possible to deposit such layers on single glazing units (also referred to as monolithic glazing units) or even on the outermost face of a multiple glazing unit (conventionally called face 1) or even on the interior face of a multiple glazing unit (conventionally called face 4 for a double glazing unit) because such layers degrade very rapidly and oxidize under the action of exterior moisture or even moisture present in the interior. Such layers are therefore not durable when placed on the external face and must necessarily be placed on the internal face of a multiple glazing unit. Even though it is not limited to such layers, one of the main objectives of the present invention is to provide glazing units equipped with stacks of layers acting on the amount of heat passing through the glazing unit and at least one of which is made of copper or of the precious metal Ag or Au) and more particularly of silver.

With the aim of allowing a stack comprising at least one silver layer to be deposited on an (internal or external) exterior face, it has already been proposed in the literature to protect such a stack with a film made of a polymer plastic material, which covers said stack after its deposition. Mention may be made by way of example of the following patent applications:

Patent application WO 2013089185 describes a configuration in which a polyacrylonitrile (PAN) or polymethacrylonitrile (PMAN) polymer is used, said polymer being deposited on a stack reflecting the IR, itself placed on a substrate. It is indicated that the polymer allows the stack to be protected by increasing its resistance to abrasion and its mechanical strength, especially when it is subjected to stresses generated by exterior thermal variations.

Patent application EP2685294 alternatively describes the use of a protective plastic film made of polycycloolefin with the aim of making an external stack reflecting the IR mechanically resistant.

French patent application FR2414114 describes the use, by way of protective layer, of a polyethylene (PE), polypropylene (PP) or polyacrylonitrile (PAN) polymer.

The choice of the protective polymer, in these prior-art documents, is guided by the quality of the mechanical protection and the chemical resistance, in particular to corrosion that is provided to the stack thereby. According to the present invention, other criteria also appear necessary for a satisfactory implementation of the protective film.

First and foremost, the protective film must not substantially degrade the initial optical and energetic properties of the glazing unit into which it is incorporated and in particular those provided by the stack of thin layers acting on the amount of heat passing through the glazing unit (i.e. the stack having the low-E or solar-control function)

Another essential parameter resides in the ease with which the protective film may be deposited on the stack and its chemical compatibility therewith and in particular with the outermost layer of dielectric material of said stack, most often a layer of an oxide such as silicon oxide, titanium oxide, tin oxide, zinc oxide or even a mixed zinc tin oxide. Insufficient compatibility between the polymer and the external layer of the stack in particular makes it likely that said polymer will, sooner or later, be torn off and the properties, in particular the thermal control properties, of the glazing unit lost.

Thus, the objective of the present invention is to provide a glazing unit that is usable for thermal control purposes, especially a solar-control glazing unit or what is referred to as a low-E glazing unit, or even a glazing unit for a refrigerator door or window, especially incorporating a metal layer such as mentioned above in a low-E or solar-control stack that may be placed on one of the external faces of said glazing unit while still being durable timewise.

Thus, the present invention relates to all types of thermal control glazing units, i.e. not only to solar-control glazing units but also to thermally insulating glazing units.

More precisely, the present invention relates, in its most general form, to a glazing unit comprising at least one substrate equipped with a stack of thin layers reflecting infrared radiation, for example IR and/or thermal radiation, in which said stack is covered with a protective polymer film made of styrene-butadiene copolymer (PSB), the thickness of the polymer film being smaller than 10 microns.

According to preferred but nonlimiting embodiments of the present invention:

Said styrene-butadiene copolymer is a copolymer formed from successive blocks of polystyrene and polybutadiene.

The polybutadiene blocks represent between 60 and 80% of the weight of the polymer.

Said copolymer is a block polymer and more preferably is of the poly(styrene-b-butadiene-b-styrene) (often called SBS) type and respects the following formula:

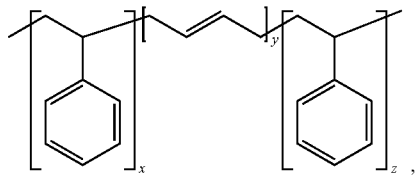

in which: 100<x<1000

1000<y<5000

100<z<1000, and preferably x=z.

The molecular weight of the copolymer is higher than 100,000 g/mol and preferably is comprised between 100,000 and 200,000.

The substrate comprises glass and more preferably is a glass pane.

The stack of thin layers reflecting infrared radiation comprises at least one metal layer chosen from silver, copper, gold and alloys thereof, more preferably silver or an alloy based on silver (i.e. comprising more than 80 at % silver).

The stack of thin layers reflecting infrared radiation comprises as top layer an oxide, nitride or oxynitride and preferably oxide dielectric layer, on which is directly deposited the external protective film.

Said top layer is an oxide chosen from zinc oxide, silicon oxide, tin oxide, titanium oxide, and zinc tin oxide.

Said top layer is a nitride of silicon and/or aluminum.

The thickness of the polymer film made of styrene-butadiene copolymer is smaller than 7 microns.

The thickness of the polymer film made of styrene-butadiene copolymer is larger than or equal to about 1 micron and preferably is larger than or equal to 2 microns.

Said glazing unit is a single glazing unit comprising a single glazing substrate, on which said stack of thin layers reflecting infrared radiation, covered with a protective polymer film made of styrene-butadiene copolymer, is placed on an external face of the glazing unit.

Said glazing unit is a multiple glazing unit, comprising at least two glazing substrates, the stack of thin layers reflecting infrared radiation, covered with a protective polymer film made of styrene-butadiene copolymer, is placed on an external face of the glazing unit.

The multiple glazing unit comprises on an external face a first stack of thin layers reflecting infrared radiation, covered with a protective polymer film made of styrene-butadiene copolymer and on an internal face a second stack of thin layers reflecting infrared radiation.

The invention also relates to the use of a glazing unit such as described above as a glazing unit having an anticondensation function, in which said stack of thin layers reflecting infrared radiation covered with a protective polymer film made of styrene-butadiene copolymer is placed on an external face of the glazing unit.

The glazing unit described above may also be used as a glazing unit having a solar-control or thermal-control function, said stack of thin layers reflecting infrared radiation covered with a protective polymer film made of styrene-butadiene copolymer being placed on the interior face of the glazing unit (i.e. that external face of the glazing unit which is oriented toward the interior of the dwelling or passenger compartment).

The following definitions are given:

The expression "infrared radiation" is understood to mean solar or near-IR radiation of wavelength comprised between 0.78 and 3 microns and thermal (or mid) IR radiation of wavelength comprised between 3 and 50 microns.

A solar-control (or antisolar) glazing unit has the function of reflecting most of the near-IR in solar radiation in order to prevent heating of the dwelling or passenger compartment.

A thermal-control glazing unit has the function of reflecting most of the thermal IR in order to prevent loss of heat from the dwelling/passenger compartment to the exterior.

By polymer made of styrene-butadiene copolymer, what is meant is any compound obtained by copolymerization of butadiene and styrene using conventional techniques, in particular of the type described in the reference publication "*Techniques de l'ingénieur, Caoutchouc styréne-butadiéne (SBR): élaboration et propriétés*", Ref 0992, 20 Jun. 2014.

According to a first configuration of a glazing unit according to the invention, the glazing unit is a single glazing unit, i.e. it comprises a single glazing substrate on which is placed a stack acting on infrared radiation incorporating a succession of thin layers including one layer of silver, of thickness for example of about 5 to 20 nanometers, reflecting the infrared. The silver layer comprises thereabove and therebelow in the stack dielectric layers of silicon nitride or oxides. On the stack, a polymer film, made of styrene-butadiene copolymer, in the sense given above, is deposited. The polymer film made of styrene-butadiene copolymer allows the stack to be exposed on an external face (interior or exterior) of the glazing unit and the durability thereof to be guaranteed, as will be demonstrated below. In such a glazing unit, for example used as a building window, the face on which the stack and the protective film are deposited is turned toward the interior of the building. This configuration allows the single glazing unit to be used as a solar-control glazing unit or even as a low-E glazing unit.

According to a second configuration of a glazing unit according to the invention, the glazing unit is a double or triple glazing unit, i.e. it comprises two or three glazing substrates separated by a gas-filled cavity or even a PVB thermoplastic sheet. On an external face of the multiple glazing unit is placed the stack 2 acting on infrared radiation. On the stack, a polymer film made of styrene-butadiene copolymer, in the sense given above, is deposited. The polymer film made of styrene-butadiene copolymer allows the stack to be exposed on an external face (toward the interior or toward the exterior) of the glazing unit and the durability thereof to be guaranteed, as will be demonstrated below.

According to a first embodiment of such a glazing unit, for example employed as a building window, the stack is present on face 1 of the multiple glazing unit, the protective film being turned toward the exterior of the building (conventionally, the faces of the glazing substrates of a single or multiple glazing unit are numbered from the exterior to the interior of the passenger compartment/premises to which they are fitted). This configuration makes it possible to limit condensation on said exterior face of a multiple glazing unit, in particular in the case of triple glazing units, which are very insulating.

According to a second embodiment of such a glazing unit employed as a building window, the stack is placed on face 4 of the double glazing unit or face 6 of a triple glazing unit, such that the face on which the stack and the protective film are deposited is the face turned toward the interior of the building. This configuration allows the multiple glazing unit to be used as a solar-control or thermally insulating (low-E) multiple glazing unit. A particularly advantageous configuration for a double glazing unit according to this embodiment consists in combining this first stack deposited on face 4 with another infrared-reflecting stack positioned this time on face 2 or face 3 of the double glazing unit.

Of course, it would also be possible to place the stack and the film on the two exterior faces of a multiple glazing unit in order to obtain a glazing unit cumulating low-E/solar-control/anticondensation functions.

Though the application more particularly described above is an architectural glazing unit, it will be clear that other applications, especially automotive glazing units such as side windows, automobile roofs, rear windshields, or even the windows or glazed doors of freezers, are envisionable.

The advantages of the present invention are illustrated using the following nonlimiting comparative examples and nonlimiting examples according to the invention.

REFERENCE

A 4 mm-thick substrate made of the clear glass Planilux sold by Saint-Gobain Glass France was used.

On the substrate a stack of layers was deposited by well-known magnetron sputtering techniques. The deposited stack is in accordance with example 4 of patent application WO2007/101964 A1 and comprises a layer of silver of 10 nm thickness. Additionally, an overlayer of thickness smaller than nanometers of $TiO_2$ is deposited on this stack. The glazing unit thus obtained was used as a reference in all the following examples: on this reference glazing unit, for the sake of comparison, various polymers were deposited according to the following experimental protocols:

EXAMPLE 1: Deposition of an Inorganic Polysilazane Film of Two or Five Microns

In this example, on the surface of the reference glazing unit, a film of perhydropolysilazane was deposited from an NN-120 resin sold by Clariant, by spin-coating techniques, dibutyl ether being used as a solvent. In the spinner, the rotation speed and concentration of the polymer were adjusted to obtain a layer of about 2 or 5 microns thickness.

EXAMPLE 2: Deposition of an Organic Polysilazane Film of One or Five Microns

In this example, on the surface of the substrate, a film of polydimethylsilazane was deposited from a CAG-37 resin sold by Clariant, by spin-coating techniques, a mixture of n-butyl acetate and toluene in a volume ratio of 98:2 being used as a solvent. In the spinner, the rotation speed and concentration of the polymer were adjusted to obtain a layer of about 1 or 5 microns thickness.

EXAMPLE 3: Deposition of a Styrene-Butadiene Copolymer (PSB) Film of Three Microns In this example, on the surface of the substrate, a film of PSB was deposited by spin-coating techniques, using a polystyrene-block-polybutadiene-block-polystyrene resin sold by Sigma-Aldrich under the reference 182877 and containing 30 percent by weight styrene. The resin was dissolved beforehand in xylene (solvent) and filtered to 0.2

μm. In the spinner, the rotation speed and concentration of the resin in the solvent were adjusted to obtain a layer of about 3 microns thickness.

EXAMPLE 4: Deposition of a Styrene-Butadiene Copolymer Film of Ten Microns

The procedure was the same as that of example 3 but the rotation speed and concentration of the resin were adjusted using techniques known in the art to obtain a layer of about 10 microns thickness.

EXAMPLE 5: Deposition of a Polyacrylonitrile (PAN) Film of Five Microns

In this example, on the surface of the substrate, a film of polyacrylonitrile (PAN) was deposited from a PAN resin sold by Sigma-Aldrich, by spin-coating techniques, DMSO being used as a solvent. In the spinner, the rotation speed and concentration of the polymer were adjusted to obtain a layer of about 5 microns thickness.

EXAMPLE 6: Deposition of a Polyethylene (PE) Film

The spin-coating deposition trials carried out by the Applicant company did not allow a uniform film of polyethylene to be obtained directly on the surface of the glazing substrate, above the stack of thin layers made of inorganic material.

The samples according to examples 1 to 6 were then subjected to the following tests in order to measure their energetic and optical performances and their durability.

The energy and optical properties and the durability of the various glazing units were measured by way of the following criteria:

Transmittance $T_L$: light transmission in % under illuminant D65, layer side, according to the criteria defined in the international standard ISO 9050:2003.

Normal emissivity: it was calculated according to the criteria defined in international standard NF EN 12898:2001.

Haze: by haze, measured in percentage, what is meant in the context of the present invention is loss due to light scattering, i.e. conventionally the ratio of the scattered portion of the light (scattered fraction or $T_d$) to the light directly transmitted through the glazing unit ($T_L$), generally expressed in percent. Diffuse transmittance thus measures the fraction of light scattered by the layers deposited on the surface of the glass substrate. Haze may conventionally be measured by spectroscopy techniques, integration over the entire domain of the visible (380-780 nm) allowing the normal transmittance $T_L$ and diffuse transmittance $T_d$ to be determined. Such a measurement may also be obtained using a hazemeter. A glazing unit is considered to be transparent if its haze remains lower than 10% and preferably lower than 5% or even lower than 1% during a measurement with a hazemeter. The apparatus used was a "Haze-Gard®" device sold by BYK-Gardner.

$SO_2$ test: this was a first test of the durability of the stack protected by the film to acid aggressions ($SO_2$ vapor). The test performed was in accordance with that described in standard EN1096-2:2001, annex C. First the conformity of the glazing unit with the standard, especially in visual terms, was verified. The variation in emissivity (Δε) and light transmittance (ΔTL) were also measured after the test.

NSS test: this was a second test of the durability of the stack protected by the film to saline aggressions. The test performed was in accordance with that described in standard EN1096-2:2001, annex D. Next the conformity of the glazing unit with the standard (points 4 and 7 of the standard) was measured. The variation in emissivity (Δε) and the variation in light transmittance ($ΔT_L$) and color (ΔE*) were also measured and the visual appearance checked under the conditions of the standard after 4, 11 and 15 days and up to 50 days of testing if necessary.

HH Test: This was a test of resistance to wet heat according to the standard EN 1096-2:2001, annex B. The test was carried out, in the context of the present invention, over a duration of 50 days. It made it possible to determine whether the sample was able to withstand the effects of the penetration of moisture long-term. The following severity conditions were applied:

temperature of the test: 50° C.±1.5° C.;

relative humidity: 90%±5%;

duration of the test: 50 days.

No appearance of major visual defects must be detected after the test (visual appearance). The sample is then declared to have passed (OK).

ΔE* was defined as follows:

$ΔE^* = (ΔL^{*2} + Δa^{*2} + Δb^{*2})^{1/2}$, where ΔL*, Δa* and Δb* are the difference in the measurement of L*, a* and b* (in the international Lab system) before and after the $SO_2$ or NSS test.

Tear resistance test: this test measured the force of adhesion between the protective polymer film and the stack of layers. The test performed was in accordance with that described in standard NF EN ISO 2409 of Aug. 2007. The classification reported in the following table is in accordance with that described in table 1 of the standard. A classification of 0 indicates a strong adhesion of the film, an index of 5 (max) indicates a very low resistance of the film to being torn off.

Table 1 below collates all of the results obtained:

TABLE 1

| Resin (example) | Thickness of the film [μm] | $ε_{initial}$ [%] | Light trans. (TL) [%] | Haze Appearance | HH Test (50 days) Δε | ΔE* | ΔTL | Visual appearance | Variation after $SO_2$ test (1 cycle) Δε | ΔTL | Visual appearance |
|---|---|---|---|---|---|---|---|---|---|---|---|
| Reference | 0 | 4 | 88 | transparent | 5.9 | 0.37 | −1.5 | NOK | −0.1 | −2.6 | NOK |
| Inorganic | 2 | 42 | 82 | transparent | * | * | * | * | 2.5 | 1 | NOK |
| polysilazane | 5 | 48 | 81 | transparent | * | * | * | * | * | * | * |

TABLE 1-continued

| | | | | | | | | | | | |
|---|---|---|---|---|---|---|---|---|---|---|---|
| (example 1) | | | | | | | | | | | |
| Organic polysilazane (example 2) | 1 | 14 | * | transparent | * | * | * | * | −1 | −1.3 | NOK |
| | 5 | 61 | 81 | transparent | * | * | * | * | * | * | * |
| PSB (example 3 and 4) | 3 | 15 | 82 | transparent | 1.9 | 0.46 | −0.3 | OK | 0.3 | 0.1 | OK |
| | 10 | 30 | 82 | transparent | * | * | * | * | * | * | * |
| PAN (example 5) | 7 | 21 | 81 | hazy | * | * | * | * | * | * | * |
| PE (example 6) | Film could not be deposited | — | — | — | | | | | — | — | — |

| | NSS Test | | | | | Tear resistance test Classification Table 1 of the standard |
|---|---|---|---|---|---|---|
| | Days | Δε | ΔE* | ΔTL | Visual appearance | |
| Reference | 10 | 7.3 | 3.8 | −1.5 | NOK | — |
| Inorganic polysilazane (example 1) | 4 | 13.5 | 4.2 | 2 | NOK | 0 |
| | 4 | 17.6 | 3.8 | 1.5 | NOK | 0 |
| Organic polysilazane (example 2) | 11.5 | 0 | 11.9 | 0.1 | OK | 0 |
| | 21 | 0.1 | 0.4 | 0.8 | OK | 0 |
| PSB (example 3 and 4) | 50 | 0.2 | 1.1 | −0.2 | OK | 0 |
| | * | * | * | * | * | 0 |
| PAN (example 5) | * | * | * | * | * | 5 |
| PE (example 6) | — | — | — | * | — | — |

The results collated in table 1 above show that the optical, color and energy performances of the samples according to examples 1 to 7 differ substantially.

In particular, it will be noted that the coatings made of inorganic polysilazane (example 1) do not allow a sufficient durability to be obtained for the glazing unit, in particular in the NSS or $SO_2$ tests.

Furthermore, the application of coatings made of organic polysilazane (example 2) to the initial stack led to a high overall glazing-unit emissivity, even for very small film thicknesses.

Implementation of a coating made of polyacrylonitrile (PAN) also does not guarantee the durability of the glazing unit as there is a very substantial risk that the film will be torn off. The glazing unit according to example 6 furthermore has a hazy appearance under light (measured haze of 15%).

As indicated above, the polyethylene film proved to be very difficult or even impossible to apply directly to the substrate by conventional deposition techniques.

In the end, only the configurations according to the examples according to the invention, using a protective film made of styrene butadiene copolymer, led to a durable protection of the stack reflecting the infrared whatever the test (HH, $SO_2$ or NSS) performed, while at the same time preserving for the most part the initial optical, color and energy performances of the glazing unit.

The invention claimed is:

1. A solar-control or thermally insulating or anticondensation transparent glazing unit, comprising:
   a stack of thin layers reflecting infrared radiation,
   wherein the stack is covered with a protective polymer film consisting of styrene-butadiene copolymer,
   wherein the protective polymer film has a thickness smaller than 10 microns, and
   wherein the styrene-butadiene copolymer is a copolymer consisting of, in polymerized form, successive blocks of polystyrene and polybutadiene.

2. The solar-control or thermally insulating or anticondensation transparent glazing unit of claim 1, wherein the polybutadiene blocks represent between 60 and 80% of a weight of the protective polymer film.

3. The solar-control or thermally insulating or anticondensation transparent glazing unit of claim 1, wherein the copolymer is a poly(styrene-b-butadiene-b-styrene) block copolymer of a formula:

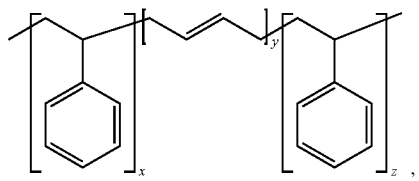

wherein
100<x<1000,
1000<y<5000, and
100<z<1000.

4. The solar-control or thermally insulating or anticondensation transparent glazing unit of claim 3, wherein x=z.

5. The solar-control or thermally insulating or anticondensation transparent glazing unit of claim 1, wherein the copolymer has a molecular weight higher than 100,000 g/mol.

6. The solar-control or thermally insulating or anticondensation transparent glazing unit of claim 1, wherein the stack comprises a glass-comprising layer, and
wherein the glass-comprising layer serves as a substrate.

7. The solar-control or thermally insulating or anticondensation transparent glazing unit of claim 1, wherein the stack comprises a metal layer comprising silver, copper, and/or gold.

8. The solar-control or thermally insulating or anticondensation transparent glazing unit of claim 1, wherein the stack comprises, as a top layer an oxide, nitride, or oxynitride, on which is directly deposited the protective polymer film, and
wherein the protective polymer film is configured to be external on an outer surface.

9. The solar-control or thermally insulating or anticondensation transparent glazing unit of claim 8, wherein the top layer is zinc oxide, silicon oxide, tin oxide, titanium oxide, or zinc tin oxide.

10. The solar-control or thermally insulating or anticondensation transparent glazing unit of claim 8, wherein the top layer is a nitride of silicon and/or aluminum.

11. The solar-control or thermally insulating or anticondensation transparent glazing unit of claim 1, wherein the protective polymer film has a thickness smaller than 7 microns.

12. The solar-control or thermally insulating or anticondensation transparent glazing unit of claim 1, wherein the protective polymer film has a thickness of at least 1 micron and smaller than 10 microns.

13. A single glazing unit, comprising:
a single glazing substrate; and
the solar-control or thermally insulating or anticondensation transparent glazing unit of claim 1 placed on an external face of the single glazing substrate.

14. A multiple glazing unit, comprising:
a first glazing substrate;
a second glazing substrate;
the solar-control or thermally insulating or anticondensation transparent glazing unit of claim 1 placed on an external face of the first and/or second glazing substrate.

15. A multiple glazing unit comprising:
a first glazing substrate;
a second glazing substrate; and
a first and a second of the solar-control or thermally insulating or anticondensation transparent glazing unit of claim 1,
wherein a first stack of the stack of thin layers reflecting infrared radiation is arranged on an external face of the first glazing substrate, and a second stack of the stack of thin layers reflecting infrared radiation is arranged on an internal face of the first glazing substrate.

16. The solar-control or thermally insulating or anticondensation transparent glazing unit of claim 1, wherein the glazing unit has an anticondensation function,
wherein the stack is placed on an exterior face of the glazing unit.

17. The solar-control or thermally insulating or anticondensation transparent glazing unit of claim 1, wherein the glazing unit has a solar-control or thermal-control function,
wherein the stack of is placed on an interior face of the glazing unit.

18. The solar-control or thermally insulating or anticondensation transparent glazing unit of claim 1, wherein the protective polymer film has a thickness of at least 2 microns and smaller than 10 microns.

19. The solar-control or thermally insulating or anticondensation transparent glazing unit of claim 1, having a haze lower than 5%.

20. The solar-control or thermally insulating or anticondensation transparent glazing unit of claim 1, having a wet heat resistance according to the standard EN 1096-2: 2001, annex B, at 50±1.5° C. and a relative humidity of 90±5%, over a duration of 50 days.

* * * * *